(12) United States Patent
Broekhuis et al.

(10) Patent No.: US 6,309,527 B1
(45) Date of Patent: Oct. 30, 2001

(54) THERMOSETTING RESINOUS BINDER COMPOSITIONS, THEIR PREPARATION AND USE AS COATING MATERIALS

(76) Inventors: Antonius Augustinus Broekhuis; Jeffrey Roy Van Hek; Petrus Gerardus Kooijmans, all of Badhuisweg 3, 1031 Amsterdam (NL)

( * ) Notice: Subject to any disclaimer, the term of this patent is extended or adjusted under 35 U.S.C. 154(b) by 0 days.

(21) Appl. No.: 09/646,143

(22) PCT Filed: Mar. 23, 1999

(86) PCT No.: PCT/EP99/01975

§ 371 Date: Sep. 13, 2000

§ 102(e) Date: Sep. 13, 2000

(87) PCT Pub. No.: WO99/48980

PCT Pub. Date: Sep. 30, 1999

(30) Foreign Application Priority Data

Mar. 24, 1998 (EP) .................................................. 98302201

(51) Int. Cl.$^7$ ........................................................ C09D 5/44
(52) U.S. Cl. .......................... 204/501; 204/502; 204/507; 523/404; 525/382; 528/228
(58) Field of Search .............................. 525/382; 528/228; 204/489, 501, 502, 503, 507, 508; 523/404

(56) References Cited

U.S. PATENT DOCUMENTS

| 4,070,532 | 1/1978 | Hammer | 526/11.2 |
| 5,698,663 | 12/1997 | Kinneberg | 528/392 |

FOREIGN PATENT DOCUMENTS

| 0636472 | 7/1994 | (EP) . |
| 2246785 | 2/1992 | (GB) . |
| WO 92/14780 | 9/1992 | (WO) . |
| WO 95/16748 | 6/1995 | (WO) . |

*Primary Examiner*—Robert Dawson
*Assistant Examiner*—D. Aylward

(57) ABSTRACT

The invention relates to thermosetting resinous binder compositions comprising a cationic resin (1) and a cross-linking agent (2), wherein the cationic resin (1) is an epoxy resin/amine adduct with on average more than one primary amine group, and the cross-linking agent (2) is a polyketone with on average more than one 1,4-dioxobutylene groups in the backbone. The invention also relates to the preparation of these compositions, and their use in general and in CED more particularly.

10 Claims, No Drawings

THERMOSETTING RESINOUS BINDER COMPOSITIONS, THEIR PREPARATION AND USE AS COATING MATERIALS

FIELD OF THE INVENTION

The present invention relates to thermosetting resinous binder compositions, to their preparation, and to the use of these binder compositions in paints. The invention relates in particular to the use of these binder compositions in cathodic electrodeposition systems.

BACKGROUND OF THE INVENTION

Thermosetting resinous binder compositions, e.g., as used in paints, usually contain a cross-linking component. This cross-linking component reacts during stoving with the functional groups of the main resinous binder component, and the cross-linking provides a network which is insoluble and infusible, and therefore resistant to solvents and elevated temperatures.

In automotive industry, both solvent borne and water borne paints may be used, but the latter are preferred for environmental reasons. Nowadays a substantial part of the water borne paints, and those applied in electro-deposition systems (ED) in particular, are based on epoxy resins as binder. Such binder compositions are for instance used to provide automobiles with a base coating.

The presently used cathodic ED (CED) system is based on cationic hydroxyl-containing epoxy resin/amine adducts. The hydroxyl groups provide for the adhesion, whereas the amine groups render the adducts water-soluble and ensure deposition on the substrate acting as cathode. The system is based on an epoxy resin (e.g., a compound having an epoxy functionality greater than 1) as such resins have excellent stability during storage.

CED systems based on these adducts will contain a cross-linker and usually also a catalyst. Examples thereof include: (A) phenol-formaldehyde (PF) or amino-formaldehyde resins (both melamine-formaldehyde [MF] and urea-formaldehyde [UF] types) and a strong acid (as disclosed in U.S. Pat. No. 4,177,124); (B) non-acidic polyesters having more than one β-hydroxyl ester group per molecule and a metal salt (as disclosed in U.S. Pat. Nos. 4,332,711 and 4,362,847), and (C) partially blocked organic polyisocyanates (such as disclosed in UK patent 1,409,728, or in U.S. Pat. Nos. 3,947,338 and 3,947,339) and a metal salt. At present, the vast majority of CED systems is based on epoxy resin/amine adducts and partially blocked organic polyisocyanates in the presence of a metal salt.

The aforementioned CED systems (A) to (C) all provide very good corrosion resistance on bare steel; adequate bath stability and good ED characteristics. However, they also suffer from certain drawbacks. Thus, the system based on MF typically has a pH value of approximately 4.5 and is hence considered too acidic and corrosive for general application. The system based on the β-hydroxyl ester has to be cured at relatively high temperatures, say about 160 to 180° C. This system can therefore not be applied on articles composed of metal parts and plastic parts—which need to be conductive if these parts are also to be coated—as the plastic parts would deform during curing. Besides, the system results in high stoving losses due to the split-off of volatile organic compounds, and requires the presence of a metal salt—typically a lead salt—as catalyst. The latter is known to be an environmental hazard (C&EN Oct. 27, 1997 p. 43–54). The system based on blocked polyisocyanates has the same disadvantages as that based on the β-hydroxyl ester. In addition this cross-linker itself is cause for further concern due to its poisonous nature. Finally, in each of these "trans" reactions volatile organic compounds are released, which have to be trapped. Inadvertent condensation of these compounds during the curing may be detrimental to the appearance of the cured composition.

It would be desirable to have a thermosetting resinous binder composition that does not suffer from the aforementioned drawbacks, e.g., that is as versatile to apply as the aforementioned compositions, in particular by ED, that requires no environmentally hazardous or corrosive catalyst; is non-toxic; does not result in the release of volatile organic waste, and —importantly—allows cure at reduced temperatures (e.g., about 140° C. and below).

Although a combination of all of these properties is important, the final more so as it would allow coating conductive plastic parts, and articles of mixed composition.

SUMMARY OF THE INVENTION

The invention relates to thermosetting resinous binder compositions comprising a cationic resin (1) and a cross-linking agent (2), wherein the cationic resin (1) is an epoxy resin/amine adduct with on average more than one primary amine group, and the cross-linking agent (2) is a polyketone with on average more than one 1,4-dioxobutylene groups in the backbone.

The invention also relates to the preparation of these compositions, and their use in general and in CED more particularly.

DETAILED DESCRIPTION OF THE INVENTION

As stated, in the thermosetting resinous binder composition the epoxy resin/amine adduct and the polyketone have on average more than one primary amine group and more than one 1,4-dioxobutylene group, respectively, per molecule. This means that their average functionality is more than 1. The average functionality of at least one of the two components (i.e., primary amine group and 1,4-dioxobutylene group respectively) is preferably larger than 2. More preferably, the average functionality of both components is larger than 2. The epoxy resin/amine adduct has typically a functionality of at most 10. For a given chain length the functionality of a polyketone is at maximum if the polyketone has a perfectly alternating structure.

The reaction of both components occurs when both components are brought into contact, already at ambient temperature. Therefore, no or only marginal heating will suffice. Suitably, the components are reacted by heating to a temperature of 50 to 150° C., typically 120 to 140° C. Higher temperatures may be used, but are not required.

In general, the ratio of both components may depend on their functionality. Typically, the cationic resin and the cross-linking agent may be applied in a weight ratio of 100:1 to 1:100, although weight ratios of 50:1 to 1:50, particularly 20:1 to 1:20, e.g., 19:1 to 3:2 are preferred.

Component (1) of the composition, i.e., the cationic resin, may be a resinous saturated compound having a molecular weight of at least 300. When used in CED systems, it preferably has a molecular weight of at least 900, more preferably in the range of 2000 to 5000. Compounds having much higher molecular weights (40,000+) are not preferred as they will be difficult to dissolve.

In the context of this patent document the molecular weights unless otherwise indicated are number-average molecular weights.

Component (1) will ordinarily contain hydroxyl groups. Suitably, it has an alcoholic hydroxyl content in the range of 0.1 to 25 milliequivalents per gram, more suitably in the range of 1 to 20 meq/g. Outside this range, the composition may have difficulty adhering to, e.g., metal substrates or have difficulty in producing an acceptable and appealing coating. When applied in CED systems it preferably has a hydroxyl content in the range of 1.5 to 15 meq/g, more preferably in the range of 2 to 10 meq/g.

Although epoxy resin/amine adducts suitable as component (1) are not sold as such, their synthesis is known, e.g., in the aforementioned patent publications (GB-A-1,409,728 in particular), and in the European patent applications Nos. 25,555 and 212,483. For instance, component (1) may be produced by reacting an epoxy resin (3), with an "amine source" such as ammonia, a di- or polyfunctional compound having at least one temporarily blocked primary amine group, or a polyamine containing at least one primary amine group.

Suitable epoxy resins include resins produced (I) by reaction of epichlorohydrin with a polyol, with a polyacid (such as the diglycidyl ester of hexa-hydrophthalic acid) or a polyamine (e.g., tetraglycidated diaminodiphenylmethane); (II) by copolymerisation of glycidyl (meth)acrylate in an addition polymer (e.g., with styrene and/or (hydroxy)alkyl esters of (meth)acrylic acid); or (III) by epoxidation of olefinically unsaturated aliphatic or cycloaliphatic hydrocarbons. The diglycidyl ether of polypropylene glycol is an example of a resin produced by reacting a polyol with ECH. However, particularly suitable when hydrolytic stability is required, i.e., in ED paints, are the epoxy resins based on diphenylolpropane (e.g., the epoxy resins sold by Shell, CIBA-GEIGY or Dow, under the trademark "EPIKOTE", "ARALDITE" or "DER" respectively), diphenylolmethane, or with a novolac resin.

The amount of amine source to be used is preferably at least that amount sufficient to render the resin cationic and water-soluble, and thus transportable to the cathode. Preferably all of the epoxy groups in the resin are reacted with an amine source.

The preparation of an adduct with ammonia is extensively described in EP-A-0,212,483. The preparation with (an excess of) a polyamine is similar. The excess reactants may later be removed if desired, e.g., by stripping.

Preferably, the adduct is made by reacting the resin with a compound having a temporarily blocked primary amine group, and at least one further functional group that is able to react with the epoxy resin. The nature of the blocking group is not important, provided it is easily removed. This compound suitably has a molecular weight of more than 50 and it has suitably a molecular weight of less than 20,000, preferably less than 5,000.

A suitable blocking group is a ketimine group, produced by reacting the primary amine with a ketone (e.g., acetone, methyl iso-butyl ketone or methyl ethyl ketone). The temporary blocking may be undone by reaction with water, suitably in the presence of an acid such as lactic acid. Compounds having one or more ketimine groups (hereinafter ketimines) are hence preferred.

This second functional group may for instance be a hydroxyl group, a thiohydroxyl group or a sterically hindered primary amine group. The latter compounds are not easy to make, whereas the compounds containing a hydroxyl group or a thiohydroxyl group are less reactive. Therefore, this second functional group is preferably a secondary amine group. Suitable examples include ketimines of:

an $\alpha,x$-alkanediamine ($x \ne \alpha$, $\omega$; e.g., 1,2-propanediamine);

an N-alkyl alkanediamine (e.g., N-(2-hydroxyethyl)-1,2-ethanediamine; N-(2-hydroxyethyl)-1,3-propanediamine; N-ethyl-1,2-ethanediamine; N-methyl-1,3-propanediamine; N-cyclohexyl-1,3-propanediamine; N-(2-aminoethyl)-ethanolamine);

a dialkylene triamine (e.g. diethylenetriamine; N,N-dimethyldipropylenetriamine; ethylenepropylenetriamine; dipropylenetriamine); or a trialkylenetetramine (e.g., triethylenetetramine; N,N'-bis(3-aminopropyl)ethylenediamine) and higher homologues.

These polyketimines will yield highly functional adducts, which are preferred as component (1) in the present invention.

The epoxy resin/amine adduct may or may not be modified by incorporating therein an amino compound having per molecule two N-H functions that are reactive with epoxy groups. These functions may be embodied in a single primary mono-amine group or in two secondary amine groups. Further this amine may have other functions as well which react hardly if at all with epoxy groups, such as hydroxyl or tertiary amine groups. Examples are monoethanolamine, monoisopropanolamine, 3-(N,N-dimethylamino)propylamine, the reaction product of one mole of 1,6-diaminohexane with 2 moles of glycidyl ester of branched monocarboxylic acids, and amino-containing amides.

Component 2 of the composition, i.e., the polyketone, is preferably an olefin-carbon monoxide polymer. The olefin-carbon monoxide polymer may be perfectly alternating (molar ratio olefin:carbon monoxide equals 1:1 with 1,2-addition of the olefin), semi-perfectly alternating (molar ratio olefin:carbon monoxide equals 1:1, but with some olefin addition other than 1,2) or random (e.g., having a carbonyl content of about 30 up to 50 mole percent as disclosed in U.S. Pat. No. 2,846,406). Regarding the latter group it should be observed that the theoretical degree of conversion is limited by the distribution of the carbonyl groups as 1,4-dioxobutylene groups across the polymer chain. Preferably the olefin-carbon monoxide is perfectly alternating or semiperfectly alternating.

The olefin-carbon monoxide polymer may be a "homopolymer", that is, when it is prepared from carbon monoxide and either ethene, a (substituted) styrene, an olefinically unsaturated hydrocarbon (such as vinyl acetate, ethyl acrylate and N-vinylpyrrolidone), an alpha-olefin or an internal olefin. It may also be a "copolymer" when two or more different olefins are used in its preparation. The polymer is prepared from carbon monoxide and olefins having from 2 up to 14 carbon atoms, in particular from alpha-olefins having from 2 to 8 carbon atoms (formation of polymers of still larger olefins is not attractive). Preferably, the olefin-carbon monoxide polymer is a homopolymer or copolymer of carbon monoxide and olefins selected from ethene, propene, butene-1 and styrene. Particularly preferred are the perfectly alternating homopolymers of ethene and carbon monoxide or styrene and carbon monoxide; the perfectly or semiperfectly alternating homopolymers of propene and carbon monoxide; the perfectly alternating copolymers of ethene/styrene and carbon monoxide; and the perfectly or semiperfectly alternating copolymers of ethene/propene and carbon monoxide or propene/styrene and carbon monoxide. (The use of "homopolymer" and "copolymer" refers to the repeating unit of the polymer. In other literature such homopolymers have—in view of the carbon monoxide monomer—been referred to as "copolymer").

In particular when the olefin-carbon monoxide polymer is an alternating homopolymer of an alpha-olefin having three or more carbon atoms, the alpha-olefin may be incorporated predominantly in a regioregular fashion or in a regio-irregular fashion. The use of a regio-irregular homopolymer or of a copolymer has the advantage in that its viscosity is lower than that of an otherwise comparable (regio-regular) homopolymer.

The olefin-carbon monoxide polymer may have a molecular weight ranging from 200 to about 500,000. For application as curable resin or in a curable resin composition, the polymer suitably has a molecular weight ranging from 500 to 20,000. Preferably the polymer has a molecular weight in the range of 1,000 to 5,000, more preferably in the range of 2,000 to 3,500.

An advantage of using olefin-carbon monoxide polymers that have a relatively low molecular weight resides in the fact that they can be liquid at the temperatures in the range of 10–80° C., i.e., the temperatures generally used in the processing thereof.

The synthesis of the (preferred) olefin-carbon monoxide polymer is not part of this invention. Information thereon may be found in the cited patent specifications and in for instance EP-A-0,121,965, EP-0,181,014, EP-A-0,516,238 and EP-A-0,522,635, and the documents mentioned in the European search reports annexed thereto.

The olefin-carbon monoxide polymer may also be a polymer to which a vinyl monomer such as styrene is grafted. The resulting graft polymer may have a higher water resistance and may have other (cost) benefits.

The difference between a conventional ED system and that of the new system, may be schematically represented as follows:

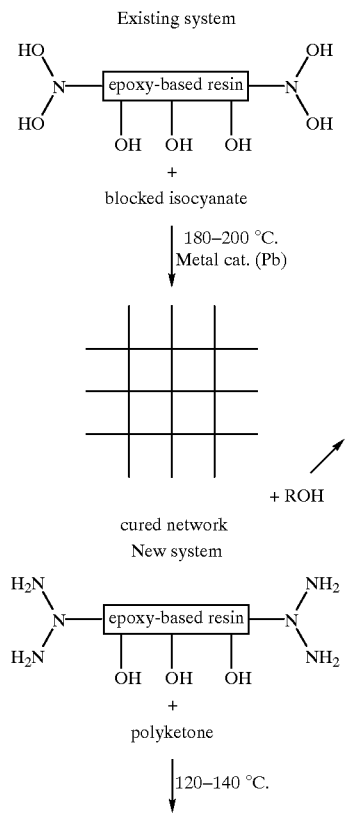

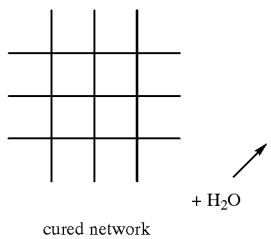

The advantages are: (I) the blocked isocyanate is replaced by the environmentally more benign polyketone (e.g., the low or high molecular weight polyketones); (II) the system is curable in an expedient manner at 120 to 140° C.; (III) there are no volatile organic compounds split off during cure, and (IV) the system requires no (toxic) catalyst.

In CED coatings in particular these advantages are sought after. For instance, the lower curing temperature allows the coating of conductive plastic parts, which would otherwise melt or distort. As CED provides the base layer of automotive coatings (which further include a primer-surfacer, a base topcoat and a clear topcoat that each cure at less than the stoving temperature of conventional systems), now all parts of the assemblage including the plastic parts will have an identical appearance. The lack of volatile organic compounds ('VOCs') eleviates the need for hoods and reduces the risk of condensed VOCs falling on the freshly coated articles. Finally, the environmental risks of lead and the aversion to lead is well-known. The systems of the present invention would therefore be a welcome contribution to the art.

Thermosetting resinous binder compositions comprising a mixture of cationic resins and/or a mixture of cross-linking agents may be used as well. Indeed, if the composition comprises a mixture of cross-linking agents, part thereof may be polyketone and part thereof may be conventional cross-linking agent. However, in that case the advantages of the present invention are generally not fully achieved.

The curing of the present compositions is achieved by a process known in the art as the "Knorr-Paal" reaction.

For instance, in EP-A-0,372,602 polyketones are reacted with polyamines. However, this publication is silent on water borne thermosetting resinous binder compositions. It in particular does not teach there suitability in cathodic electrodeposition systems.

As is highlighted above, the compositions of the present invention are particularly suitable for cathodic electrodeposition, i.e., as water-borne CED system. They may be applied on a variety of conductive materials, in particular metals such as bare (degreased) steel, phosphated steel, chrome-treated steel, zinc, aluminum, or tin plate (for can coating), to produce cured coatings of desirable thickness, from 2 micrometers up to in general 40 micrometers. However, CED is not the only manner by which these compositions may be applied; they may also be applied by brushing, spraying, dipping, roller coating, or other methods known in the art. Typically, these compositions will comprise conventional additives such as pigments, fillers, dispersants, stabilizers, co-solvents, and the like. The water for use in aqueous compositions is preferably purified, such as by distillation or demineralization.

In electrodeposition processes employing the water borne systems of the present invention, two electrodes are immersed in a bath containing the system. After the electrical field is applied, the positively charged cationic resin and the polyketone (as well as the further additives, if any)

move towards the electrically-conductive substrate at the cathode. The deposition stops after a certain time and the coated substrate is taken out of the bath.

The conditions under which the electrodeposition is carried out are in general similar to those used in electrodeposition of other types. The applied voltage may be varied greatly and is typically between 50 volts and 500 volts. The current density is usually between 0.1 and 2 amperes per square meter, and tends to decrease during electrodeposition.

After rinsing with water, the coated substrate is put in an oven at the aforementioned temperatures for the curing process.

A further possible use of the composition of the present invention is as adhesive interlayer on solid components, i.e., polymer-based matrices, wood and metal composites, etc. Thus, it may be used to coat reinforcing fillers like natural and synthetic fibers used in structural composites. For instance, many mechanical rubber goods, such as tires, hoses and conveyor belts, contain textile reinforcements for strength and dimensional stability. These composites can only perform well if adhesion between the fibers and rubber is sound.

The compositions of the present invention may also be used in solvent borne systems. However, in water borne systems, both components are separated from each other by the water phase. The reaction only occurs when both components are brought together, e.g., on the cathode. When applied in solvent borne systems, for the compositions not to cure prematurely, the components have to be dissolved in separate solutions (e.g., as in two-component lacquers) or be dissolved at very low concentrations.

The invention is demonstrated by the following examples. In these examples the following chemicals are used:

| | |
|---|---|
| DETA | diethylenetriamine |
| MIBK | methyl isobutyl ketone |
| HD | 1, 6-hexanediamine |
| CE10 | "Cardura E10", which is the Shell trademark for the glycidyl ester of a branched carboxylic acid with 10 carbon atoms in the backbone of the acid moiety. |
| E1001 | "EPIKOTE 1001", which is the Shell trademark for the diphenylolpropane-based epoxy resin having an epoxide content of 2000 mmol/kg and a hydroxyl content of 2200 mmol/kg. |
| DEMUR | defunctionalised multifunctional epoxy resin, prepared by reacting 61.5 g of an epoxy novolac resin, having on average 3.1 epoxy groups per molecule with 35.2 g nonylphenol, in the presence of 0.025% m/m N(CH$_3$)$_4$.Cl as catalyst (cf. EP-A-0, 251,360). |
| MEK | methyl ethyl ketone |
| bO | 2-butoxyethanol, sold as butyl "OXITOL", "OXITOL" is a Shell trademark |

EXAMPLE 1

Preparation of the Ketimine

A ketimine was produced by reacting 103 g DETA with 200 g MIBK, in a glass reactor fitted with temperature controller, magnetic stirrer, reflux-condenser and 'Dean Strak' trap. The mixture was heated to the boiling temperature of MIBK (116° C.). The mass was allowed to react until full conversion of the amine groups was reached. The ketimine was isolated by stripping off the excess MIBK using a 'Rotavap' (70° C. at 30 mbar). It was used without further purification.

EXAMPLE 2

Preparation of the Flexibiliser

An internal flexibiliser is produced by reacting 116 g (1 mole) HD with 496 g (2 moles) CE10. The HD is melted and heated to 100–110° C. under a nitrogen blanket in a 1000 ml reactor equipped with a stirrer, thermo-couple and dropping funnel. The portion of CE10 is added gradually, so that the temperature is maintained between 100 and 110° C. After completion of the CE10 addition (about 0.5 hr.), heating was continued at 100° C. for about 2 hrs.

EXAMPLE 3

Preparation of Amine Adducts (I to IV)

Epoxy resin and the reaction solvent (MEK or THF/ethanol) were heated in the amounts set out in Table 1 at reflux temperature in a glass reactor equipped with an anchor-type stirrer, thermocouple and reflux condenser. The temperature was decreased to 80° C. (25° C. in the preparation of adduct IV) after a homogeneous melt was formed. To this mixture the ketimine produced in Example 1, the flexibiliser produced in Example 2 and/or the other components set out in the Table were added. Conversion to the amine adduct (typically having a molecular weight in the order of 4,000 to 5,000) occurred in about 1 hr. The reaction solvent (and excess ammonia) were removed by distillation and nitrogen purge in the mass. The final product was diluted with bO.

TABLE 1

| Adduct No. | I | II | III | IV |
|---|---|---|---|---|
| Composition (g) | | | | |
| ketimine | 53.4 | 53.4 | 53.4 | |
| Ammonia 25% in H$_2$O | | | | 40.8 |
| Ethanol amine | | 6.1 | | |
| E1001 | 189.2 | 283.8 | 283.8 | 70.8 |
| DEMUR | | | | 145.1 |
| flexibiliser | 61.2 | 61.2 | 122.4 | |
| MEK | 76.0 | 101.1 | 114.9 | |
| THF/ethanol 4:1 m/m | | | | 77.3 |
| bO | 147.8 | 191.0 | 214.6 | 63.5 |
| Typical product data | | | | |
| N content (meq/g) | 2.63 | 2.22 | 2.18 | 0.95 |
| OH content (mmol/g) | 3.30 | 3.46 | 3.48 | n.d. |
| Solids content (%) | 67.3 | 67.9 | 68.2 | 60.0 | n.d.: not determined

EXAMPLE 4

Preparation of the Polyketone

An olefin-carbon monoxide polymer was prepared as disclosed in example 10 of EP-A-0,522,635. The polymer had a (number average) molecular weight of 1940, an olefin:carbonyl mole ratio of 1:1, an average functionality of 5.4 equivalents/kg, and having ethene and propene incorporated in a mole ratio of 30:70.

EXAMPLE 5

Clear Electrodeposition Lacquers

The adducts I, II and III, lactic acid and demineralized water were blended in the amounts set out in Table 2 at 50° C. until a clear solution was generated. Then the olefin-carbon monoxide polymer of Example 4 was added and mixed. Finally, the mixture was diluted with a further addition of demineralized water (solids content of about 15%).

TABLE 2

| Adduct No. | I | II | III |
|---|---|---|---|
| Composition (g) | | | |
| Adduct | 451.6 | 595.5 | 674.2 |
| lactic acid | 32.0 | 40.5 | 50.9 |
| Demineralized water | 200.0 | 200.0 | 200.0 |
| polyketone | 74.0 | 74.0 | 74.0 |
| Demineralized water | 1542.4 | 2061.3 | 2339.6 |

In order to test the composition on coating properties, a bath was filled with the mixture and two stainless steel electrodes were immersed in the bath. An electrical field was applied for about 120 s (DC 100 to 200 Volts; electrode distance of 3 cm). Next, the coated substrate was taken out of the bath. After rinsing with water, the substrate was put for 30 minutes in an oven operating at 140° C. for the curing process to proceed.

The thickness of the obtained coated substrates was between 12 and 25 microns. In all instances, the solvent resistance (MEK) was excelled (>50 double rubs), as was the impact resistance (passed the 'Erichsen' conical mandrel bend) and adhesion resistance (>4.5 m.kg for the reverse impact resistance). Salt-spray tests showed that less than 5 mm loss of adhesion from scratch resulted after 2 weeks. After 4 weeks of storage of the coated substrates the test results were similar to the previous results.

EXAMPLE 6

Clear Electrodeposition Lacquer

In a manner identical to Example VI of EP-A-0,251,360 adduct IV was blended with respectively the polyketone and 2-n-hexyloxyethanol, neutralized with lactic acid and finally diluted with demineralized water to arrive at a lacquer having a solids content of 15 %w.

The lacquer was also applied and evaluated in the manner described in that reference. In other words, the lacquer was used to coat 330 ml tin-plate cans (2-piece DW1 cans) by CED. The can formed the cathode, the anode being a stainless steel electrode inserted within the can at a substantially uniform separation of 2 millimeters of the can. A potential difference of 100–120 V, which resulted after baking in a coating weight per can in the range of 200–250 mg, corresponding with an average dry film thickness in the range of 5 to 6 microns, was applied between the can and the anode for 1–2 seconds. After removal from the ED cell, the coated can was vigorously rinsed with demineralized water and the coating was cured by stoving for 5 minutes at 200° C.

After curing and measuring the weight of the coating, the porosity was tested by using a WACO ENAMEL RATER (ex Wilkens-Anderson Co. USA). The principle of this method is that when a potential difference (6.2V) is applied between the can filled with an electrolytic solution and an electrode inserted in said electrolytic solution, a current will pass between the electrode and the inner surface of the can only if the coating has insufficient insulating power, i.e., when the film contains pores. Hence the current measured is a yard stick for the film quality. A current <0.6 mA is considered to correspond with a non porous film.

The results are given in Table 3. In this table, solvent resistance is expressed in terms of "MEK rubs", i.e., the number of double rubs with a MEK-moistened cloth necessary to remove the coatings, while the film appearance (flow) is expressed as a numerical rating resulting from a visual assessment (5:smooth surface, excellent flow, no defects, 4: orange-peel type surface, 3: orange-peel type surface and few bubbles and/or pinholes, 2: many bubbles and/or pinholes).

The results in Table 3 indicate that the cationic coating composition made according to the process of the present invention, but not yet optimized, is very satisfactory.

TABLE 3

| Adduct No. | VI |
|---|---|
| Composition (g) | |
| Adduct | 1000 |
| Polyketone | 177 |
| Cymel 1141 | |
| lactic acid (90% w) | 39 |
| 2-n-hexyloxyethanol | 61 |
| Demineralized water | 3929 |
| Coating properties | |
| Film appearance | 5 |
| MEK resistance | 30 |

EXAMPLE 7

Pigmented Electrodeposition Paints

The adducts I, II and III, lactic acid and demineralized water were blended in the amounts set out in Table 4 at 50° C. until a clear solution was generated. Then the mixture was diluted with a further addition of demineralized water until an aqueous binder solution (a) having a solids content of about 30% was formed.

Subsequently, the pigments with part of the aqueous binder solution (a) were dispersed for about an hour in a sand mill until a sand mill charge (b) having a Hegman fineness of less than 10 micrometer was reached.

The paint composition was formed by blending the aqueous binder solution (a), sand mill charge (b) the olefin-carbon monoxide polymer of Example 4, and demineralized water.

TABLE 4

| Adduct No. | I | II | III |
|---|---|---|---|
| Solution (a) (g) | | | |
| Adduct | 451.6 | 476.3 | 486.0 |
| lactic acid | 32.0 | 32.4 | 36.7 |
| Demineralized water | 419.8 | 443.9 | 449.3 |
| Sand mill charge (b) (g) | | | |
| Solution (a) | 400.0 | 400.0 | 400.0 |
| Titanium dioxide RHD2 | 72.0 | 72.0 | 72.0 |
| Special schwarz 4 | 4.0 | 4.0 | 4.0 |
| Clay ASP-100 | 4.0 | 4.0 | 4.0 |
| Paint composition (g) | | | |
| Solution (a) | 503.4 | 552.6 | 572.0 |
| Charge (b) | 480.0 | 480.0 | 480.0 |
| Demineralized water | 172.6 | 138.1 | 124.6 |

TABLE 4-continued

| Adduct No. | I | II | III |
|---|---|---|---|
| polyketone | 74.0 | 59.2 | 53.4 |
| Demineralized water | 1603.0 | 1603.0 | 1603.0 |
| solids (%) | 15.0 | 15.0 | 15.0 |

In order to test the composition on coating properties, a bath was filled with the mixture and two stainless steel electrodes were immersed in the bath. An electrical field was applied for about 120 s (DC 100 to 200 Volts; electrode distance of 3 cm). Next, the coated substrate was taken out of the bath. After rinsing with water, the substrate was put for 20–30 minutes in an oven operating at 120–160° C. for the curing process to proceed.

The thickness of the obtained coated substrates was between 15 and 25 microns. In all instances, the solvents resistance (MEK) was excelled (>50 double rubs). Again, the mechanical properties were good. Salt-spray tests showed that less than 5 mm loss of adhesion from scratch resulted after 20 days (ASTM B 117-64).

EXAMPLE 8

Evaluation as Adhesive Interlayer

The effect of a curable resin composition according to the invention on the adhesion of a yarn of polyketon fiber ("CARILON" P1000 yarn of 1761 denier; having an LVN of 1.5 dl/g, measured in m-cresol at 60° C.) with a rubber ("CARIFLEX" S-1712DF, compounded according to ASTM D3185, method 2B) was evaluated in a manner similar to the so called H-pull test (ASTM D2138). In this test a (coated) single fiber is embedded on both ends into a block of rubber which is then vulcanized. After vulcanization the embedded fiber is pulled out of the rubber matrix. The required force is a measure for the adhesion stress.

The curable resin composition contained solution (a) of adduct 1 described above and the polyketone according to example 4 in a weight ratio of 83/17.

The yarn was used as such or coated with the coating solution. The coating was applied on the yarn manually by dipping it into a bath. In order to remove excessive material the yarn was gently wiped with a cloth. Immediately after the coating was applied the mould was prepared and pressed. The vulcanization was carried out in a mould as prescribed in ASTM D2138-3, H-test. Vulcanization took place in a non preheated compression moulding machine at 145° C. and 35 bar for 50 minutes. Subsequently the mould was cooled in a cold water bath. The applied conditions guarantee at least a 90% vulcanization of this particular SBR compound. The samples were evaluated on a INSTRON tensile tester at a cross head speed of 100 mm/min and with a 2 kg load cell. The adhesion strength was calculated as follows: The required force to pull out the yarn was divided by the embedded length in the rubber matrix. When no coating was applied, the adhesion force per mm imbedded fiber length amounted to 0.31 N/mm. When the resin according to the invention was applied, this adhesion force increased to 0.44 N/mm ("CARILON" and "CARIFLEX" are both shell trademarks).

What is claimed is:

1. A thermosetting resinous binder composition comprising a cationic resin (1) and a cross-linking agent (2), wherein the cationic resin (1) is an epoxy resin/amine adduct with at least two primary amine groups, and the cross-linking agent (2) is a polyketone with at least two 1,4-dioxobutylene groups in the backbone.

2. A thermosetting resinous binder composition as claimed in claim 1, wherein the average functionality of both components (1) and (2) is larger than 2.

3. A thermosetting resinous binder composition as claimed in claim 1, wherein the components (1) and (2) are present in a weight ratio of 100:1 to 1:100.

4. A thermosetting resinous binder composition as claimed in claim 1, wherein component (1) has a molecular weight in the range of 300 to 40,000.

5. A thermosetting resinous binder composition as claimed in claim 1, wherein component (1) has an alcoholic hydroxyl content in the range of 0.1 to 25 milliequivalents per gram.

6. A thermosetting resinous binder composition as claimed in claim 1, wherein component (1) is made by reacting an epoxy resin with a compound having a temporarily blocked primary amine group, preferably a ketimine group, and at least one further functional group that is able to react with the epoxy resin.

7. A thermosetting resinous binder composition as claimed in claim 1, wherein component (2) is an olefin-carbon monoxide polymer having a molar ratio of olefin to carbon monoxide that equals 1:1, and having a molecular weight in the range of 200 to 500,000.

8. A process for curing a thermosetting resinous binder composition, which thermosetting resinous binder composition is claimed in claim 1, by heating components to a temperature of 50 to 150° C.

9. A process as claimed in claim 8, wherein the components (1) and (2) are deposited on a substrate by cathodic electrodeposition.

10. Substrates containing a cured resinous binder composition which has been cured by the process of claim 8.

* * * * *